Aug. 18, 1959   J. W. SPODOBALSKI   2,899,848
APPARATUS FOR DRESSING ROTARY SAWS
Original Filed June 29, 1953   4 Sheets-Sheet 1
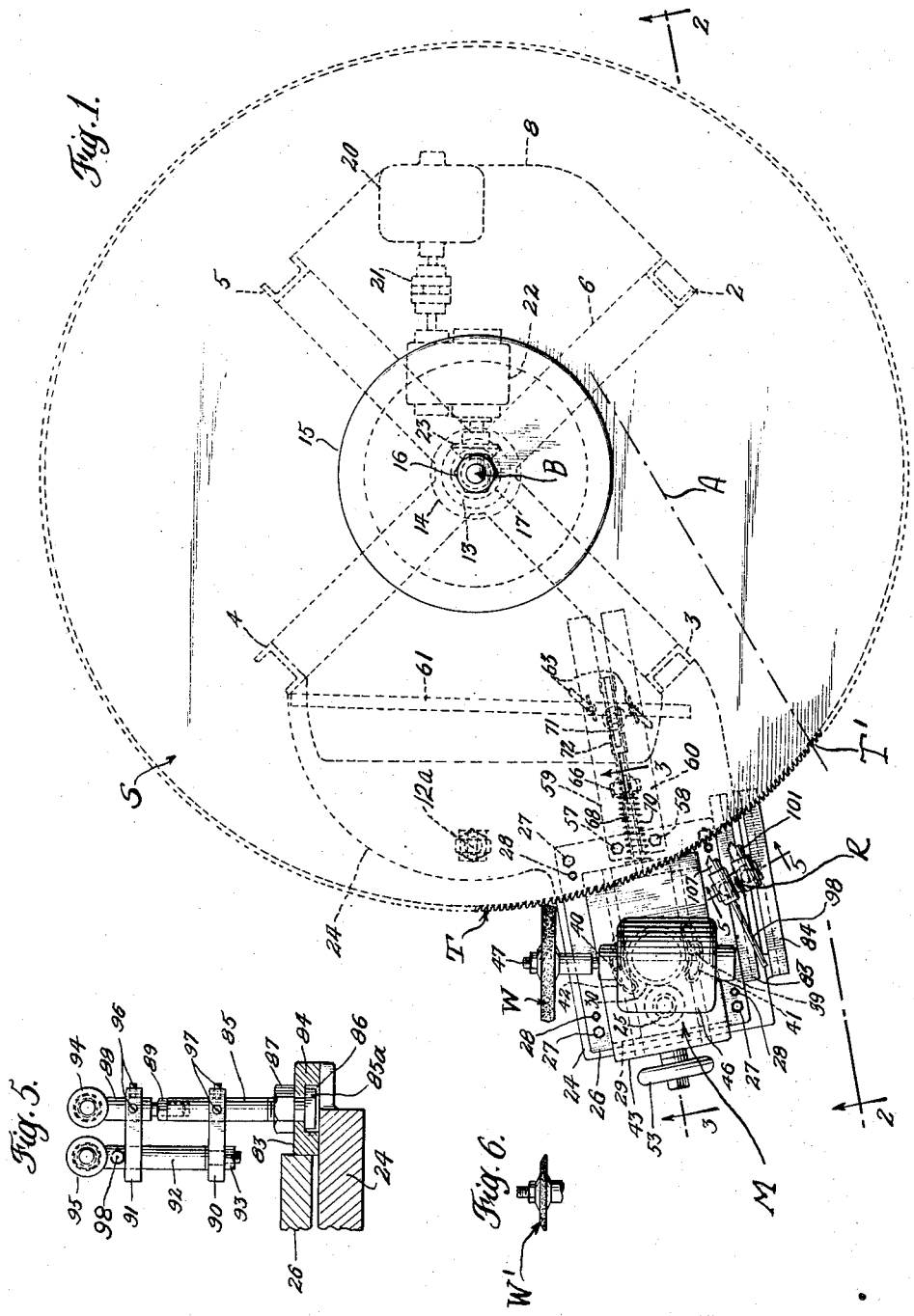
INVENTOR
Joseph W. Spodobalski
Synnestvedt & Lechner
ATTORNEYS Aug. 18, 1959   J. W. SPODOBALSKI   2,899,848
APPARATUS FOR DRESSING ROTARY SAWS
Original Filed June 29, 1953   4 Sheets-Sheet 2
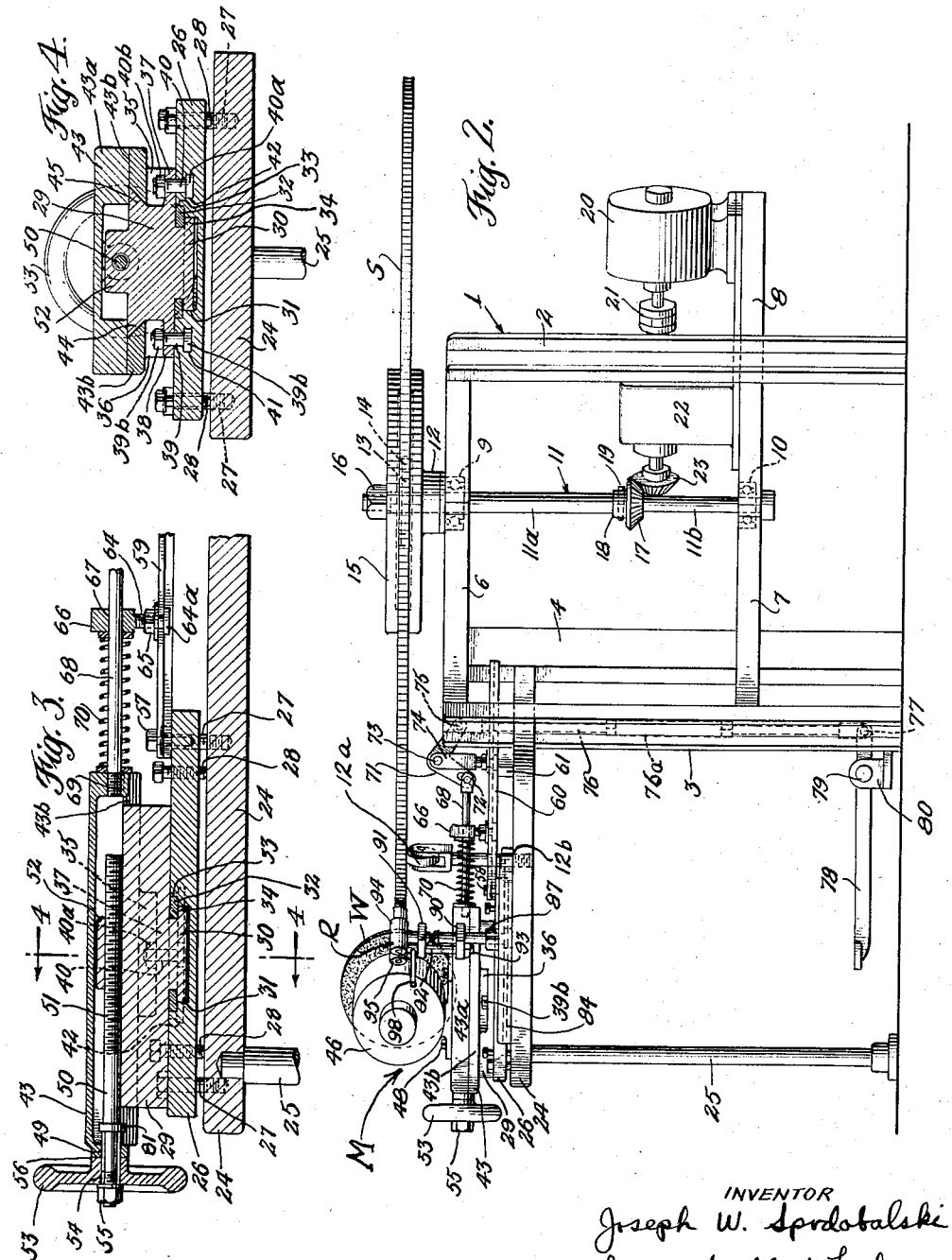
INVENTOR
Joseph W. Spodobalski
Synnestvedt & Lechner
ATTORNEYS

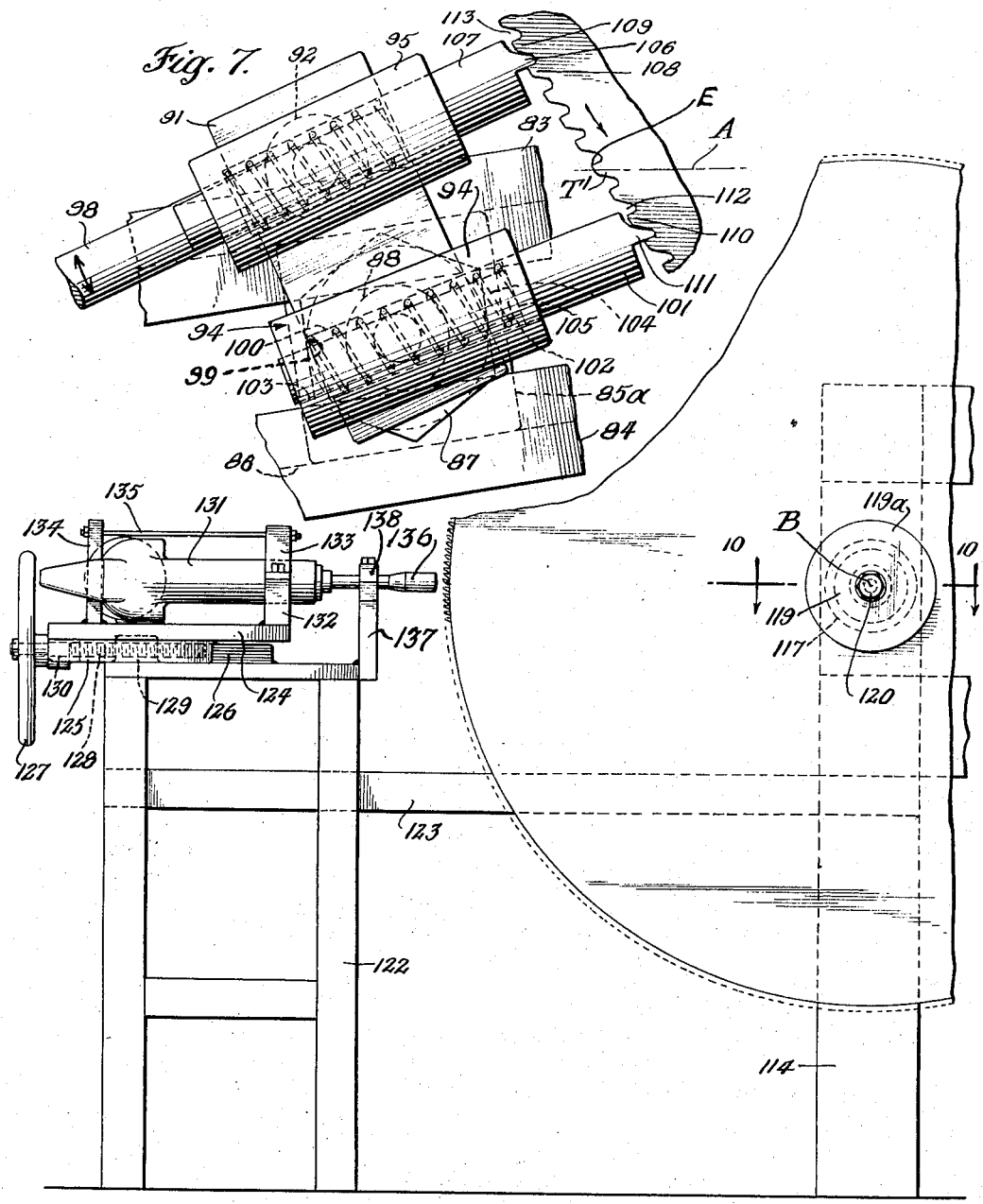

Aug. 18, 1959    J. W. SPODOBALSKI    2,899,848
APPARATUS FOR DRESSING ROTARY SAWS
Original Filed June 29, 1953    4 Sheets-Sheet 4
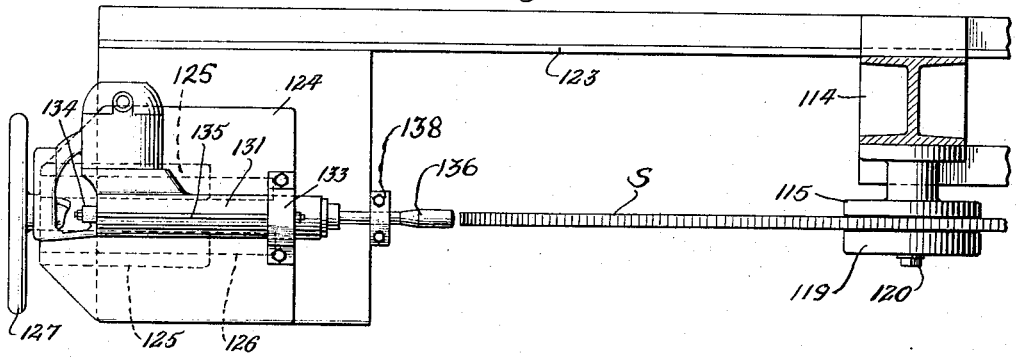
Fig. 9.
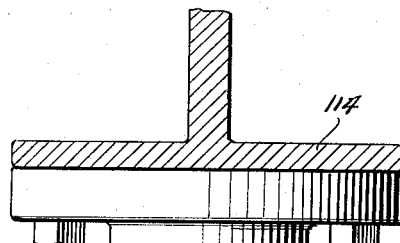
Fig. 10.
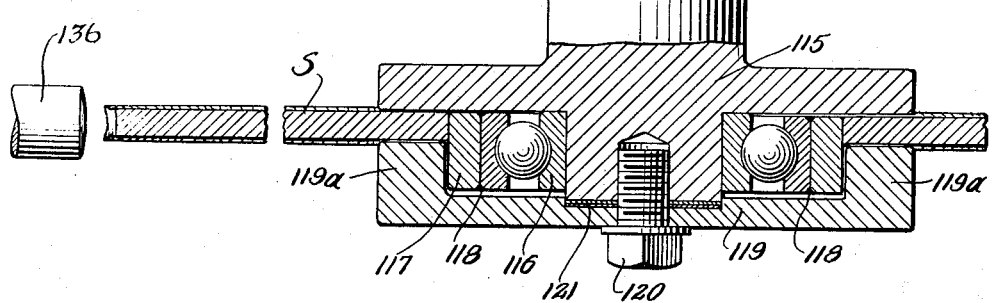
Fig. 11.    Fig. 12.
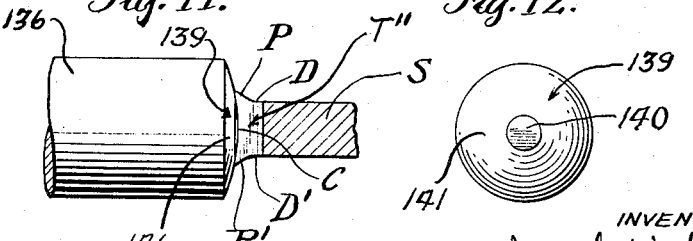
INVENTOR
Joseph W. Spodobalski
Synnestvedt & Lechner
ATTORNEYS

United States Patent Office 2,899,848
Patented Aug. 18, 1959

2,899,848

APPARATUS FOR DRESSING ROTARY SAWS

Joseph W. Spodobalski, Philadelphia County, Pa., assignor to Morris, Wheeler & Company, Inc., Philadelphia, Pa., a corporation of Pennsylvania Continuation of application Serial No. 364,528, June 29, 1953. This application July 1, 1953, Serial No. 366,743

8 Claims. (Cl. 76—48)

This invention relates generally to disk-type rotary saws for cutting of structural steel shapes such as channels, I-beams and the like. In particular, the invention relates to methods for the forming of teeth and for the dressing of worn teeth on such saws, to apparatus for carrying out such methods, to the unique shape or construction of the teeth themselves and to the relation of such teeth to the saw disk itself.

Cutting equipment for structural steel, with which ordinary disk-type saws are used, generally comprises a long, power-driven roller-type conveyor system, the structural piece to be cut being placed on one end of the conveyor and then moved along by the rollers to a cutting station where the saw, mounted on a cradle, may be moved transversely to the conveyor to cut the piece. The rollers then move the piece along the conveyor to a chipping and dumping station where an operator with a chipping hammer removes burrs and ribbons from the end of the piece, resulting from the cutting operation. After the chipping operation, the piece is removed from the conveyor and the next piece brought up before the saw. In those instances where it is desired to cut the next piece without waiting for the chipping operation, additional equipment must be provided to transfer the cut piece from the conveyor to a second independent conveyor where the chipping operation is performed while the saw continues to operate.

The ordinary saws used with such equipment are about four feet in diameter having a thickness of about ½ inch, and teeth of a depth from about ¼ to ½ inch. The top of the tooth is either flat or convex in shape, the convex curvature extending in a circumferential direction. The projection of the major axis of each tooth lies in a plane which contains the axis of rotation of the saw. The teeth in side elevation appear much like gear teeth.

It has been my experience that saws having teeth of the nature described have several disadvantages. One of these is the inability of such saws to cut a steel piece without leaving undesirable burrs or extensive ribbons of steel protruding or hanging from the cut ends of the piece (except in some cases for a very short time after being freshly sharpened). This is a serious limitation because the cutting operation must be stopped while the piece is being de-burred or chipped; thus continuous cutting is impossible without the provision of additional equipment to remove the piece from the conveyor for the chipping operation. Another disadvantage is that such saws must be frequently dressed or sharpened, for example, I have found that with an eight-hour production day the ordinary saw has on operating life of only two or three days before it must be removed and dressed. This means that the cutting equipment must be frequently idled while saws are changed. Furthermore, considerable cost is involved in the frequent dressing of the saws.

The principal object of the present invention is to provide a saw which will cut steel shapes in a manner to eliminate the necessity for chipping and to accomplish this with an operating life (between dressings) from three to seven times the number of days for the ordinary saw, while at the same time working more continuously during each eight hour day, and to provide improved methods and equipment for making and dressing such saws at minimum cost.

The advantages of the foregoing will be readily apparent to those skilled in the art. For example, by increasing the availability of the saw in use, I have greatly increased the productive capacity of the cutting equipment, which has been conducive to reducing to a minimum the back log in steel delivery schedules. I have practically eliminated the difficult and arduous task of hand chipping, making the operator available at another station along the high production conveyor with consequent saving in labor cost. Further, I have realized substantial savings in the unit cost of redressing the saws.

In the preferred form the saw teeth of the present invention are characterized by a top which is concave in shape, the curvature being generally in the direction of the axis of rotation of the saw. The intersection of the outer portions of the top and each outer side form generally triangular-shaped peaks which flare upwardly and outwardly, and the projection of the major axis of a tooth is spaced from or does not contain the axis of rotation of the saw.

For the purposes of the present case, it is to be understood that the term "dressing" of a saw or of its teeth in inclusive of "making" the same except where the context requires a more limited meaning.

In dressing teeth of the kind described, the saw is supported in a generally horizontal plane and is driven at a slow speed, while an abrasive wheel (the plane of the wheel being aligned substantially at right angles to the plane of the saw) is applied to the outer edge, i.e., to the top of the teeth. In this operation, a concave curvature is imparted to the top of each tooth. In addition, the saw is trued, that is, the top surfaces of all teeth are made to lie substantially the same distance from the axis of rotation.

The abrasive wheel is driven by a motor secured to mounting or supporting mechanism which provides for adjustable movement of the wheel toward and away from the axis of rotation of the saw so as to accommodate saws of different diameter and for saws which, in operation, have become somewhat non-circular. The wheel is adjusted by means of a hand crank. Further, the mounting mechanism provides that in any adjusted position the wheel may be moved a predetermined amount toward the axis and then back to the same adjusted position, this feature being utilized in grinding out metal between the teeth as explained later.

Means are provided for leveling the mounting mechanism and the wheel is angularly orientable on the mount, both of these features providing for the correct alignment of the wheel with respect to the saw.

After the saw teeth have been contoured as above described, the saw is removed from the rotatable support and supported on an upright for rotation in a vertical plane. The saw is slowly rotated while the top of each tooth is struck with a high speed reciprocating hammer. This operation swages or flares out the top section of each tooth, resulting in the formation of the small peaks mentioned heretofore. In the preferred form, the striking head of the hammer is in the shape of a spherical section.

After the swaging operation has been accomplished, the saw is again placed on the rotatable support. The drive mechanism for the support is disconnected so that the saw may be intermittently moved rather than continuously moved. Another abrasive wheel having the desired shape for cutting between the teeth is placed on the motor shaft and this wheel is oriented and adjusted to be in the correct position. A hand-operated ratchet-type mechanism is provided for intermittently moving the saw, i.e., tooth by tooth, relative to the grinding wheel. When the area between two adjacent teeth is moved in front of the wheel, a foot pedal is depressed which operates to move the mounting mechanism and wheel inwardly towards the axis of rotation of the saw, the grinding wheel then penetrating said area. When the wheel has completed grinding, the pressure on the foot pedal is released and a spring carries the mounting mechanism and wheel back to the adjusted position. The saw is then moved so that the succeeding area is in front of the grinding wheel and the above operation repeated until all of the areas have been so treated and the saw is then ready for use.

The manner in which the foregoing is accomplished will be apparent from the following description and drawings wherein:

Figure 1 is a plan view of saw dressing equipment or apparatus involving features of the invention, showing a saw disk mounted on the apparatus and a grinding wheel in a position for contouring and truing said disk or the teeth thereof;

Figure 2 is an elevational view of the apparatus of Figure 1 viewed as indicated by the line 2—2 of Figure 1;

Figure 3 is an enlarged longitudinal section on the line 3—3 of Figure 1 illustrating the adjustable mounting mechanism for the grinding wheel and its motor;

Figure 4 is a cross section taken on the line 4—4 of Figure 3;

Figure 5 is a vertical section on the line 5—5 of Figure 1 illustrating ratchet mechanism employed in dressing the saw teeth;

Figure 6 is a detail view of a grinding wheel;

Figure 7 is an enlarged plan view of the ratchet mechanism of Figure 5;

Figure 8 is an elevational view of swaging equipment or apparatus involving features of the invention, showing a saw disk mounted on the apparatus and a reciprocating hammer in a position for swaging said disk or the extremities of the teeth thereof;

Figure 9 is a plan view of the apparatus of Figure 8;

Figure 10 is an enlarged plan showing the saw mounting structure as taken on the line 10—10 of Figure 8;

Figure 11 is an enlarged fragmentary side view of the hammer employed in the swaging apparatus together with a fragmentary radial section of the saw, showing a tooth in elevation, to illustrate the concave top and the triangular peaks; and Figure 12 is a face view of the hammer of Figure 11.

With reference to Figures 1 and 8, the general shape of the teeth of the saw of the present invention will first be described.

In Figure 1, the disk type saw S has a plurality of teeth T on the outer edge section thereof, the teeth being shown in side elevation. As will be apparent, the projection of the major axis of any tooth is spaced apart from or does not contain the axis of rotation B of the saw. For example, the projected axis A of tooth T' passes considerably to one side of axis B. The details of the shape of the teeth as viewed in side elevation are best seen in Figure 7. The tooth T' with the projected major axis A is also seen in this view.

The shape of the teeth as viewed tangentially of the saw, i.e. in a direction transverse the axis of rotation of the saw, is seen by inspection of the tooth T" in Figure 11, which fragmentarily shows the saw S in radial section. It will be noted that the top C of the tooth is concave with the curvature running generally in the axial direction of the saw. The outer sides D and D' of the tooth extend first in a radial direction but the top portions thereof respectively flare out into peaks P and P'.

The saw disk itself flares slightly, in the sense that it is a little thicker in the peripheral region than in the region of the hub. For example, a saw disk of a four-foot diameter and approximately half-inch thickness is preferably given a taper so that it is actually about $31/64$ inch thick at the half-radius region and $1/2$ inch thick in the peripheral region, from whence, in turn, the teeth are flared out at both sides of the disk. It is also mentioned that as used in the cutting equipment the saw is arranged on its cradle such that the teeth point in the direction of rotation. Thus the edge E as seen in Figure 7 is ordinarily the working or cutting edge. The saw, as so configured, has exceptional cutting ability, and long life, when operated at a peripheral speed of between 25,000 and 30,000 feet per minute, in the cutting of structural steel.

The tapered disk per se may be made in any known manner. The methods contemplated by the present invention for shaping the teeth as described above, and typical apparatus for carrying out such methods, will be explained following.

The mechanism for supporting the saw in a generally horizontal plane and for continuously or intermittently rotating the same is best seen in Figures 1 and 2. This mechanism comprises a table generally designated by the reference numeral 1 having legs 2, 3, 4, and 5 to which are welded the top and bottom cross support members 6 and 7. The bottom cross support 7 has a mounting bracket or flanged deck 8 welded thereto. The cross supports 6 and 7 respectively carry upper and lower bearings 9 and 10 which rotatably mount the drive shaft 11. At the top end of the drive shaft 11 is secured a bracket 12 adapted to mount the saw S. The bracket has a center section 13 which extends upwardly to fit in the hub of the saw. A replaceable ring 14 may be placed over the center section so as to accommodate saws of different diameter hub apertures. After the saw is positioned on the bracket 12, a clamp 15 is placed over the drive shaft 11 and secured by bolt 16.

The drive shaft 11 has an upper portion 11a and a lower extension 11b which may be of reduced section, as shown, to form a positioning shoulder for gear 17. Apertures are provided in gear collar 18 and in the shaft which may be readily registered for insertion of the pin 19.

The bracket 8 carries a motor 20 which is connected by a clutch 21 to a gear reduction box 22. The gear reduction box is then connected to a gear 23 which meshes with the gear 17. As will be apparent, when the pin 19 is inserted the motor will continuously rotate the saw. However, when the pin is removed, the saw and shaft may be easily turned, without turning over the motor 20. For example, the saw may be intermittently moved manually by means explained hereinafter.

The mechanism M for mounting the abrasive wheel W will next be described.

This mechanism is mounted on a horizontally disposed supplementary table 24 which is supported at one end by the leg 25. As seen in Figure 1, the table extends inwardly where it is welded to the legs 3 and 4 of the main table.

On the top of the table 24 is mounted a base 26 which may be leveled with respect to the table by means of the bolt assemblies 27—28 disposed at the four corners of the base (see Figure 1). As best seen in Figure 3, the bolts 27 extend through apertures in the base 26 and engage threads in the table 24. The bolts 28 are threaded in the base 26 and extend therethrough to engage the top of the table 24. The base is leveled by loosening the bolts 27 and then manipulating the bolts 28. When the desired level is obtained the bolts 27 are then tightened down to clamp the base in place.

On top of the base is mounted a supporting bracket 29. As seen in Figures 3 and 4, its lower portion 30, which is disk-like in shape, fits into the circular recess 31 in the base 26. A split ring 32, which rests in a shoulder 33 in the base 26, fits over the lip 34 of the portion 30.

As seen in Figure 4, the supporting bracket 29 is undercut at 35 and 36 to provide the toes 37 and 38. These toes respectively carry bolts 39 and 40, the heads 39a and 40a of the bolts sliding in arcuate slots 41 and 42 in the base 26 (see Figure 1). The bolts carry nuts 39b and 40b.

As will be apparent, the above-described arrangement permits the supporting bracket 29 to be angularly orientatable with respect to the base 26; thus when the nuts 39b and 40b are loosened the support may be adjusted relative to the base and then locked into position.

On top of the supporting bracket 29 is mounted a carriage 43 comprising a top portion 43a and two lower portions 43b which are respectively secured to the top portion by bolts (not shown). As will be apparent from an inspection of Figure 4, the arrangement is such as to make a dovetailed fit with the support 29 as indicated at 44 and 45. Thus the carriage is slidable relative to the supporting bracket. As seen in Figures 1 and 2, the carriage 43 carries motor 46 having a shaft 47 which supports the grinding wheel W. The motor is bolted to the carriage as by bolts 48.

The manner in which the carriage and motor may be adjustably moved toward and away from the axis of rotation of the saw will next be explained.

As seen in Figure 3, the carriage has an aperture 49 through which extends a rod 50 having threads 51 which engage threads in the upwardly extending lug 52 of the supporting bracket 29. The rod 50 carries a hand wheel 53 which is keyed thereto as by key 54 and held fast on the shaft by nut 55. As will be apparent, the hand wheel 53 and the carriage abut one another as indicated at 56.

The base 26 carries bolts 57 and 58 which respectively secure thereto brackets 59 and 60 which are held in spaced-apart relationship. As seen in Figure 1, these brackets extend inwardly and rest on support 61 being clamped thereto by C clamps 63. This arrangement provides for the pivoting of the brackets about the bolts 57 and 58, the purpose of which will be explained hereinafter. Between the brackets 59 and 60 is a threaded stud 64 having its head 64a disposed on the underside thereof. A nut 65 is threaded on the stud and by tightening and loosening the nut the stud may be adjusted along the brackets 59 and 60. On the top of the stud is secured an abutment 66 having an aperture 67 through which extends a rod 68 which is threaded to the carriage as by threads 69. Between the carriage and the abutment is disposed a spring 70.

With the above-described arrangement, it will be apparent that by turning the hand wheel 53 in one direction (viewed in Figure 3). When the hand wheel is turned in tion, the carriage will move inwardly (to the right as viewed in Figure 3). When the hand wheel is turned in the opposite direction, the carriage will be moved outwardly under the action of spring 70. Thus, the arrangement provides for adjustably positioning the grinding wheel W relative to the axis of rotation of the saw, with great accuracy.

When the grinding wheel W (Fig. 1) for truing the saw is removed, and is replaced by the specially-shaped grinding wheel W' of Fig. 6—for initially cutting teeth on the saw, or for deepening the indentation between teeth which have been worn in use—it is not only advantageous to have the heretofore-described flexibility of adjustment of the position, wheel angle and stroke angle of grinding wheel W' (relative to the desired tooth angle, and to suit various contours of the grinding wheel periphery, such as the V-contour shown in Fig. 6) but it is also very advantageous to be able to quickly move the grinding wheel inwardly between the teeth a predetermined distance and then outwardly, clear of the teeth, to permit turning of the saw from one tooth gap to the next, and then to move the wheel again quickly into the next tooth gap, with assurance that the gaps between the teeth will all be cut to the same depth. The manner in which the grinding wheel W' may thus be moved inwardly a predetermined amount from any adjusted position and then moved back to that adjusted position will next be explained.

As is best seen in Figure 2, the rod 68 is pivotably secured to a crank 71 as by pivot 72. The crank is pivotably supported as by pivot 73 on yoke 74 which is adjustably mounted on the brackets 59 and 60 much in the same manner as explained in connection with stud 64. The other end of the crank is pivotally secured as by pivot 75 to an operating rod 76. The operating rod is pivotably secured as by pivot 77 to a foot lever 78 pivotably mounted as by pivot 79 on a bracket 80 welded to the leg 3. The operating rod 76 is provided with a turnbuckle 76a for adjusting the length thereof. When the foot lever 78 is moved downwardly the bell crank will pull the rod 68 toward the axis of rotation of the saw. Referring back to Figure 3, it will be seen that this action moves the carriage in the same direction, the amount of movement being restricted by the collar 81 secured to the rod 50 by engaging the inner end wall of the carriage around the aperture 49. When the pressure of the foot lever is released, the spring 70 will return the carriage to the adjusted position.

As will be apparent, when the carriage is adjusted by the hand wheel 53 the foot lever 78 will be moved up or down. If movement of the foot lever should prevent a required adjustment the pivot 72 may be removed so that the lever will not interfere. When the adjustment has been made the turnbuckle may be operated and the pivot 72 replaced.

The arrangement of the mechanism as above described is an important part of the invention. Summarizing its operation, it will be observed that the motor drive shift (which supports either grinding wheel) may be universally tilted with respect to the axis of rotation of the saw, this tilting motion being confined within desired limits by the screw assemblies 27—28. Furthermore, in any position of tilt, the shaft may be angularly oriented with respect to the axis of rotation of the saw. Thus, by so tilting and orienting the shaft, the grinding wheel may be desirably aligned with respect to the saw teeth.

Also, when the wheel is aligned it may be adjusted to a selected position in a direction toward and away from the axis of rotation. This accommodates saws of different diameters or those saws which have become non-circular in use, which is of importance for the contouring and truing operation.

In addition the mechanism provides that while the wheel is properly aligned and positioned, it may be moved inwardly a predetermined amount (so that, in the case of the wheel W', it grinds between the teeth) and then back to the adjusted position. This is of advantage because it insures that the area between each pair of adjacent teeth is cut to the same amount. The fact that the wheel automatically moves back under spring action is conducive to high-speed operation.

With reference to Figure 2 it will be observed that as the saw is mounted on the bracket 12 the outer portion of the saw makes contact with the supporting roller 12a, which is mounted for vertical adjustment on the table 24 by means of the threaded rod and nut assembly 12b.

The means for moving the saw in an intermittent fashion when it is disconnected from the motor drive will next be described.

This action is accomplished by means of ratchet mechanisms generally indicated by the reference character R mounted on the table 24. As best seen in Figures 1, 5 and 7, the mounting mechanism comprises two L-shaped spaced-apart brackets 83 and 84 which are welded to the table 24. A stud 85, whose head 85a is positioned in the slot 86 formed by the brackets extends upwardly and is adapted to be secured to the brackets 83 and 84 by nut 87. The stud carries a support 88 which is threaded thereto and held fixed by nut 89. The arms 90 and 91 extend respectively from the stud 85 and the support 88. A support 92 extends through an aperture in the arm 91 and a threaded portion thereof extends through an aperture in the support 90 and is held firm by the nut 93. The supports 88 and 92 respectively carry the ratchet housings 94 and 95.

As will be apparent, the support 88 may be adjusted in a vertical direction by means of loosening and tightening the nut 89. The arms 90 and 91 may be loosened with respect to the stud 85 and support 88 by means of the set screws 96 and 97. Thus, the two ratchet housings may be adjusted in a vertical direction (both absolutely and relatively). The ratchet housing 95 together with the support 92 may be angularly orientated with respect to the arms 90 and 91, by means of the handle 98 which is welded to the support 92.

The components associated with each housing are identical and therefore explanation will be made only in connection with ratchet housing 94. As seen in Figure 7, the ratchet comprises the housing 94 having a hole 100 into which fits a plunger 101 having a reduced portion 102 which extends lengthwise in the housing and out through an aperture 103. A spring 104 is disposed between a shoulder 99 on the bottom of the hole and the shoulder 105 of the plunger. As will be apparent from inspection of Figure 7, when the handle 98 is moved clockwise the cam surface 106 of plunger 107 acting on the tooth 108 will push the saw in the direction indicated by the arrow.

As that action takes place, the tooth 110 exerts a cam action upon the detent 111 and presses the plunger 101 inwardly against the pressure of spring 104, so that the detent 111 rides over tooth 110 and engages in notch 112. The detent then holds the saw stationary, while the operator swings the handle 98 in a counterclockwise direction, which action causes the cam 106 of plunger 107 to ride over tooth 109 and lodge in the notch 113, where it is ready to go through the cycle again. Before the cycle is repeated, however, the operator of the machine presses downwardly on foot pedal 78 and brings the tapered grinding wheel W' in between two teeth so as to grind the tooth interspace to the proper depth. When the operator releases the foot pedal 78, the spring 70 returns the carriage to its outer position, disengaging wheel W' from the teeth, and the operator may then manipulate handle 98 again to bring the next tooth interspace into position.

Where the mechanism shown is used to initially form teeth on a disk, it is necessary first to mark off on the disk periphery enough tooth locations, and to cut enough corresponding identations, so as to set up an operating group of teeth between the plunger cams 106, 111, and in the area preceding cam 106. From that point on, the operations above described may be followed, for cutting teeth initially.

The mechanism for swaging or flaring the teeth will be explained in connection with Figures 8 through 12.

This mechanism comprises an upright, generally indicated by the numeral 114 having a support 115 on which is pressed the bearing assembly 116. The bearing may be provided with rings to accommodate saws having different diameter hubs, for example, the ring 117 which is fitted over the outer race of the bearing and is secured thereto, as by "striking," as shown at 118. The saw S is placed over the ring 117 and then held on the bearing by means of the clamp 119 secured to the bracket 115 by bolt 120. The washers 121 may be used to space the flange 119a slightly from the saw so that the saw has just sufficient clearance to ride freely on the bearings but cannot wobble substantially.

Adjacent the supporting bracket 14 is a table generally indicated by the numeral 122 which is held in a fixed position relative to the upright 114 by means of the cross tie 123. The table mounts a carriage 124 which has downwardly projecting lugs 125 engaging the block 126 to provide for movement of the carriage relative to the table. The amount of such movement is controlled by the hand wheel 127 having a shaft 128 carried in an aperture in the downwardly extending lug 130 and having a thread operating in the lug 129.

The carriage mounts an electric hammer 131 which rests in a block 132, the hammer being held in the block by the strap 133. As will be apparent, the hammer is disposed between the block 132 and an upstanding stud 134 being held snugly between these members by means of a tie-rod 135.

The hammer head 136 extends outwardly from the hammer body and is supported on the upright 137 and held in position by the clamp 138. The upright 137 is welded to the table 122. In the preferred embodiment the hammer oscilates the head back and forth about 2200 strokes per minute. Commercially available electric, pneumatic or other hammers may be employed, and it will be observed that the mounting and positioning rig above-described has been adapted to receive such a hammer of a known pistol-grip type; the support of the hammer being largely by means of the carriage 124 (at the motor end) and by the bracket 132 (at the opposite end), and the positioning being largely by means of the member 34 which extends up between the hammer member and its pistol grip, and by means of the clamping and fastening devices 133 and 135.

The particular shape of the striking portion 139 of the hammer head is an important part of the invention and will be explained in connection with Figures 11 and 12. It will be observed that the striking portion is generally in the form of a spherical section having a circular shaped flat 140 and curved sides 141. The curvature of the sides is made to approximate the concave curvature of the teeth. The reason for the above-described structure will be more readily apparent hereinafter.

The manner in which worn teeth on a saw are dressed will next be explained.

First the ratchet mechanism R is moved rearwardly (as viewed in Figure 2) on the brackets 84 and 85. The hand wheel 53 is operated to also move the mounting mechanism in the rearward direction. Then a grinding wheel such as wheel W in Figure 1 is secured to the shaft 47.

It will be noted that the outer periphery of the grinding wheel W is slightly rounded. While it is not essential that the periphery be formed as shown, i.e., the periphery may be flat as in the case of ordinary wheels, there is a special advantage in the use of the embodiment shown because it is then usually unnecessary to reorient the motor shaft when the grinding wheel W' (see Figure 6) is applied. Also both sides of the wheel W may be used, which I have found desirable from the standpoint of wear of the wheel.

A saw to be dressed is placed on the rotatable supporting bracket 12 and then clamped by means of the clamp 15, and the pin 19 is inserted in the holes in the collar 18 and the shaft 11.

The motor 20 is energized (by means not shown) so as to rotate the saw. As has been mentioned heretofore, I have provided a gear reduction box 22 in the motor drive system. The gears in the box are arranged so as to drive the saw at about 11 r.p.m., when employing a motor 20 of ⅓ hp. turning at about 1725 r.p.m., or a ratio giving a saw peripheral speed of between 125 and 175 feet per minute. I have found these proportions to be quite effective in the truing and contouring operation, with a grinding wheel of about 8 inches diameter turning at about 1750 r.p.m.

After the saw is in place, the hand wheel is then operated so as to move the grinding wheel adjacent the teeth. If necessary, the base 26 is leveled and the support 29 angularly oriented so as to insure that the plane of the wheel is approximately at right angles to the plane of the saw and that the contacting portion of the outer periphery of the grinding wheel is so positioned as to form a line-to-line contact with the saw.

With the saw rotating, the wheel may be moved inwardly so as to progressively grind the top of the teeth. This operation makes the top of the teeth concave in shape with the curvature running generally in the direction of the axis of rotation of the saw and further trues the saw in the sense that similar top portions of the several teeth lie the same distance from the center of rotation.

After the teeth have been desirably contoured, the grinding wheel is moved rearwardly away from the saw teeth, the motor is deenergized, and the saw is then removed from the bracket 12 and placed on the upright support 114 as described in connection with Figure 10.

The hand wheel 127 is then adjusted so as to bring the striking portion of the hammer 136 approximately 5/16" away from the top of the teeth. The electric hammer is then energized. As the hammer strikes the teeth, the lateral outward deflection of the peaks P and P' is effected (see Figure 11). Whether it be due to the angularity of the teeth with respect to a radial line, or to some other cause, I have found that the action of the hammer 136 in striking the saw in rapid succession tends to cause the saw to turn gradually, so that all the teeth are progressively acted upon. However, in any case where it may be necessary, it is quite easy to slowly rotate the saw by hand, or if preferred, a motor drive may be applied.

In connection with Figure 11, it will be noted that as the hammer engages the tooth the flat 140 of the hammer is spaced apart from the center section of the tooth. This arrangement is conducive to only the top portions of the sides being swaged or flared.

I have found that this type of construction in the striking head gives very satisfactory results. While I have used hammers wherein the striking portion was entirely flat and also hammers wherein the striking portion was spherical (without the flat) and have successfully flared teeth with this type of construction, it has sometimes resulted in the whole tooth being flared rather than just the top portion thereof. Further, I found that this type of head sometimes produced teeth in which there was very little or no concave contour. Therefore, the type of construction described is much the most advantageous.

If the trimming of the teeth is to be done after the teeth have been flared, or if the saw is first flared without teeth, and the teeth are thereafter to be cut, the saw is then secured on the bracket 12 and the grinding wheel W' is fastened to the shaft 47. The hand wheel 53 is then operated to correctly position the wheel W' as earlier described.

From an inspection of Figure 1, it will be seen that the shaft 47 is oriented in a manner such that when the wheel W' is moved inwardly to the area between two adjacent teeth, the teeth will be formed to the shape indicated in Figure 7 such that the projection of the major axis thereof does not go through the axis of rotation of the saw.

If the shaft 47 must be reoriented so as to insure that the wheel W' penetrates in the correct direction, the bolts 39 and 40 are loosened and the member 29 moved the correct amount. Usually, in such adjustments, it will be necessary to reorient the brackets 59 and 60 by loosening bolts 57 and 58 together with the C clamps 63—63. The brackets 59 and 60 are respectively pivoted about the bolts 57 and 58 so that the rod 68 has freedom of movement between the brackets and then the C clamps 63 and bolts 57 and 58 are tightened up.

The ratchet mechanism is then moved toward the saw until the cams 106 and 111 penetrate the areas between the teeth as explained in connection with Figure 7. Pin 19 is then removed so as to disengage the saw from the motor drive system. The motor 46 is then energized (by means not shown) to rotate the wheel W'. The foot lever 78 is then depressed to move the wheel inwardly to grind the area between two adjacent teeth. After this area is ground, the handle 98 of the ratchet mechanism is moved to bring the next area into position. This process is continued until all of the areas have been ground out and then the saw is ready for use.

It will be apparent that the method of the invention may be practiced by apparatus other than that described, for example, the truing and contouring operation may be accomplished by milling out the top of the teeth. The metal in the areas between the teeth may also be removed by a milling operation. The flaring operation can also be performed by other mechanism for example the striking end of a cold chisel may be arranged such that when the chisel is placed on the top of the tooth and struck, the teeth will flare.

Although I have described the invention primarily in connection with the dressing of worn teeth, it will be apparent that the methods and apparatus are readily adaptable to the making of teeth on a blank disk. In such instances, the blank disk is placed on the rotatable mechanism for the contouring and truing operation, the peaks formed and subsequently the teeth ground. In grinding out the teeth, the ratchet mechanism may be used initially to steady the grinding wheel until a sufficient number of teeth are cut so that the camming action may take effect, as hereinbefore described.

In conclusion, it should be pointed out that the operation of grinding between the teeth and the flaring operation may be reversed in sequence. While I have dressed teeth in this manner, I have found it to be more advantageous to use the preferred sequence of operations hereinabove described.

This application is a continuation of my prior application, Ser. No. 364,528, filed June 29, 1953, bearing the title Rotary Saws, and Equipment and Methods for Dressing the Same, now abandoned.

I claim:

1. Apparatus for dressing the teeth on a rotary disk-type saw comprising a rotatable support for a saw; first mechanism for continuously rotating said support; second mechanism for intermittently rotating said support including control means operative as a function of the width of a tooth of the saw being worked; means to render said first mechanism inoperative when the second mechanism is operating; a drive shaft for mounting rotary means for use in dressing the saw; and mechanism for supporting said drive shaft including means for universally tilting the shaft within defined limits with respect to the axis of rotation of the support, means for angularly orienting the shaft while in any position of tilt, and means operable while the shaft is so tilted and oriented for selectively positioning the shaft in a direction generally toward and away from the axis of rotation of the support and while in a selected position for further moving the shaft a predetermined amount toward the axis of rotation and then back to said selected position.

2. Apparatus for dressing the teeth on a rotary disk-type saw, comprising a rotatable support for a saw, a drive motor, a speed reducer connected between the motor and the support, and means interconnected with said support and alternatively operable to condition the support for continuous or intermittent rotation; a drive shaft for mounting rotary means for use in dressing the saw; and mechanism for supporting said drive shaft including means for universally tilting the shaft within defined limits with respect to the axis of rotation of the support, means for angularly orienting the shaft while in any position of tilt, and means operable while the shaft is so tilted and oriented for selectively positioning the shaft in a direction generally toward and away from the axis of rotation of the support and while in a selected position for further moving the shaft a predetermined amount toward the axis of rotation and then back to said selected position.

3. Apparatus for dressing the teeth on a rotary disk-type saw comprising a rotatable support for a saw;

first mechanism for continuously rotating said support; second mechanism for intermittently rotating said support including control means operative as a function of the width of a tooth of the saw being worked; means to render said first mechanism inoperative when the second mechanism is operating; a drive shaft for mounting rotary means for use in dressing a saw; an angularly orientable support bracket; a base pivotally connected with said bracket, means for universally tilting the base within defined limits with respect to the axis of rotation of the saw support; connections between said shaft and said bracket for selectively positioning the shaft in a direction generally toward and away from the axis of rotation of said saw support; and means for further moving the shaft in said direction while so positioned.

4. Apparatus for dressing the teeth on a rotary disk-type saw comprising a rotatable support for a saw; first mechanism for continuously rotating said support; second mechanism for intermittently rotating said support including control means operative as a function of the width of a tooth of the saw being worked; means to render said first mechanism inoperative when the second mechanism is operating; a rotatable drive shaft for supporting an abrasive wheel for dressing a saw; first means connected with the shaft for moving the shaft toward and away from the axis of rotation of said support for selectively positioning the same with respect to said axis; and second means connected with the shaft for moving the shaft toward said axis and then back to said selected position.

5. A construction in accordance with claim 4 wherein said first means includes a hand crank and wherein said second means includes a foot-operated lever.

6. Apparatus for dressing the teeth on a rotary disk-type saw comprising a rotatable support for a saw; rotary means for supporting an abrasive dressing wheel; a support bracket; a carriage carrying said rotary means slidably mounted on said support; a spring urging the carriage away from the axis of rotation of the support; first means for adjustably positioning said carriage toward and away from the axis of rotation of said rotatable support including a movable rod having a collar associated therewith; second means operable in any of said adjusted positions and connected with said rod for sliding said carriage toward the axis of rotation of said rotatable support and then back to the adjusted position, the maximum amount of last said sliding being determined by said collar; and mechanism adapted to cooperate with a saw when positioned on said rotatable support to intermittently rotate the saw.

7. Apparatus for dressing the teeth on a rotary disk-type saw comprising a rotatable support for a saw, the axis of rotation of the support being substantially vertical; first mechanism for continuously rotating said support; second mechanism for intermittently rotating said support including an angularly movable spring-loaded cam adapted to engage recesses between adjacent teeth on the periphery of the saw being worked; means to render said first mechanism inoperative when said second mechanism is operating; a supporting bracket angularly orientable in a generally horizontal plane; rotary means for supporting an abrasive dressing wheel mounted on a carriage, the carriage being slidably connected with said supporting bracket; a rod extending through an aperture in said carriage having threads engaging a fixed nut on said supporting bracket, the rod carrying a hand wheel slidably engaging the carriage and further carrying a collar spaced from one end of said aperture; a second rod, one end of which is connected to the carriage and the other end connected to a foot-operated lever; and a spring disposed between said carriage and said supporting bracket.

8. Apparatus for dressing teeth on a rotary saw comprising a rotatable saw mount, mechanism for driving it to turn the saw at from 125 to 175 feet per minute peripheral speed, a grinding wheel having a diameter of substantially 8" and operative at substantially 1750 r.p.m. and mounted in a plane at approximately right angles to the plane of the saw, and means for adjusting said wheel angularly and in a direction toward and away from the saw periphery.

References Cited in the file of this patent

UNITED STATES PATENTS

| | | |
|---|---|---|
| 42,124 | Southworth | Mar. 29, 1864 |
| 179,500 | Andrews | July 4, 1876 |
| 215,267 | Covel | May 13, 1879 |
| 279,718 | Covel | June 19, 1883 |
| 321,376 | Lyon | June 30, 1885 |
| 981,135 | Sterling | Jan. 10, 1911 |
| 1,040,905 | Dow | Oct. 8, 1912 |
| 1,690,803 | Vander Wee | Nov. 6, 1929 |
| 1,866,101 | Hach et al. | July 5, 1932 |
| 2,064,407 | Bird | Dec. 15, 1936 |
| 2,336,726 | Ferguson | Dec. 14, 1943 |
| 2,490,312 | Macia | Dec. 6, 1949 |
| 2,533,648 | Warburg et al. | Dec. 12, 1950 |
| 2,559,355 | Grupp | July 3, 1951 |
| 2,589,165 | Toy et al. | Mar. 11, 1952 |
| 2,615,354 | Higgins | Oct. 28, 1952 |
| 2,619,851 | Moohl | Dec. 2, 1952 |
| 2,637,223 | Gustin | May 5, 1953 |
| 2,656,738 | Tomlin | Oct. 27, 1953 |

UNITED STATES PATENT OFFICE
CERTIFICATE OF CORRECTION

August 18, 1959

Patent No. 2,899,848

Joseph W. Spodobalski

It is hereby certified that error appears in the printed specification of the above numbered patent requiring correction and that the said Letters Patent should read as corrected below.

Column 5, line 52, strike out "tion, the carriage will move inwardly (to the right as" and insert the same after "direc-" in line 50, same column; column 6, line 33, for "shift" read -- shaft --; column 7, line 69, for "bracket 14" read -- bracket 114 --; column 8, line 14, for "oscilaltes" read -- oscillates --; column 12, line 41, list of references cited, for "Nov. 6, 1929" read -- Nov. 6, 1928 --.

Signed and sealed this 1st day of March 1960.

(SEAL)
Attest:

KARL H. AXLINE
Attesting Officer

ROBERT C. WATSON
Commissioner of Patents